United States Patent [19]

Schukei et al.

[11] Patent Number: 5,084,233

[45] Date of Patent: Jan. 28, 1992

[54] REACTOR HEAD SHIELDING APPARATUS

[75] Inventors: Glen E. Schukei, South Windsor; George J. Roebelen, Windsor, both of Conn.

[73] Assignee: Combustion Engineering, Inc., Windsor, Conn.

[21] Appl. No.: 315,679

[22] Filed: Feb. 27, 1989

[51] Int. Cl.⁵ .......................................... G21C 11/00
[52] U.S. Cl. ................................. 376/287; 250/515.1
[58] Field of Search ............................ 376/287, 289; 250/515.1, 517.1, 518.1, 519.1

[56] References Cited

U.S. PATENT DOCUMENTS

| | | | |
|---|---|---|---|
| 4,530,813 | 7/1985 | Jacobson | 376/287 |
| 4,574,070 | 3/1986 | Blaushild et al. | 376/287 |
| 4,654,188 | 3/1987 | Hankinson | 376/287 |
| 4,708,843 | 11/1987 | Desfontaines et al. | 376/289 |
| 4,797,247 | 1/1989 | Blaushild et al. | 376/289 |
| 4,828,789 | 5/1989 | Hankinson et al. | 376/287 |

FOREIGN PATENT DOCUMENTS 188321 7/1986 European Pat. Off. .

Primary Examiner—Daniel D. Wasil
Attorney, Agent, or Firm—John H. Mulholland

[57] ABSTRACT

A frame 10 with downwardly projecting members 52 mounts by means of a pair of hoists 36 and lifting bracket 42 downwardly into upwardly open recesses of complementary mounting members 54 secured to reactor head lifting legs 30. Frame 10 is mounted on the head either with lead wool shielding blankets 40 hanging from it or without. In the latter case, hangers 60 with blankets 40 hanging therefrom and horizontally gravity biased hooks 64 mounted on a curved beam 62, are lowered by hoist 36 until hooks 64 grapple, pivot and hang hanger 60 and the shielding on frame 10 at a location radially inwardly of the head bolt locations 22. The hook of hoist 36 is lowered until it is disengaged from the radially outwardly biased bail 70 of hanger 60.

11 Claims, 4 Drawing Sheets

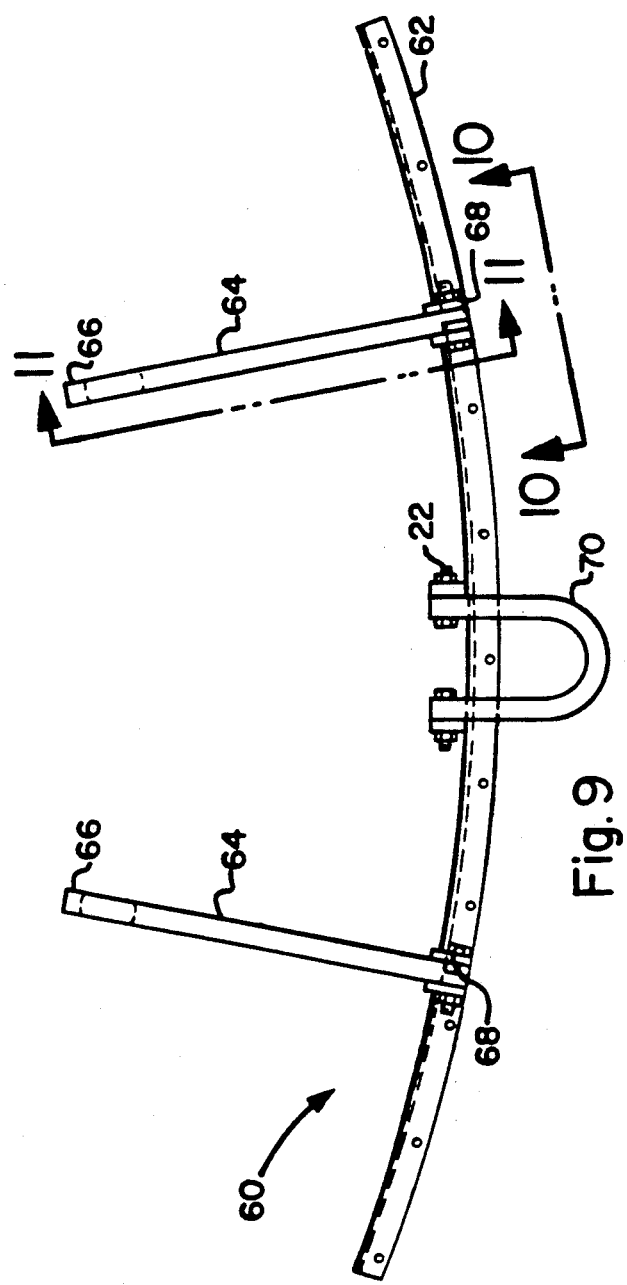
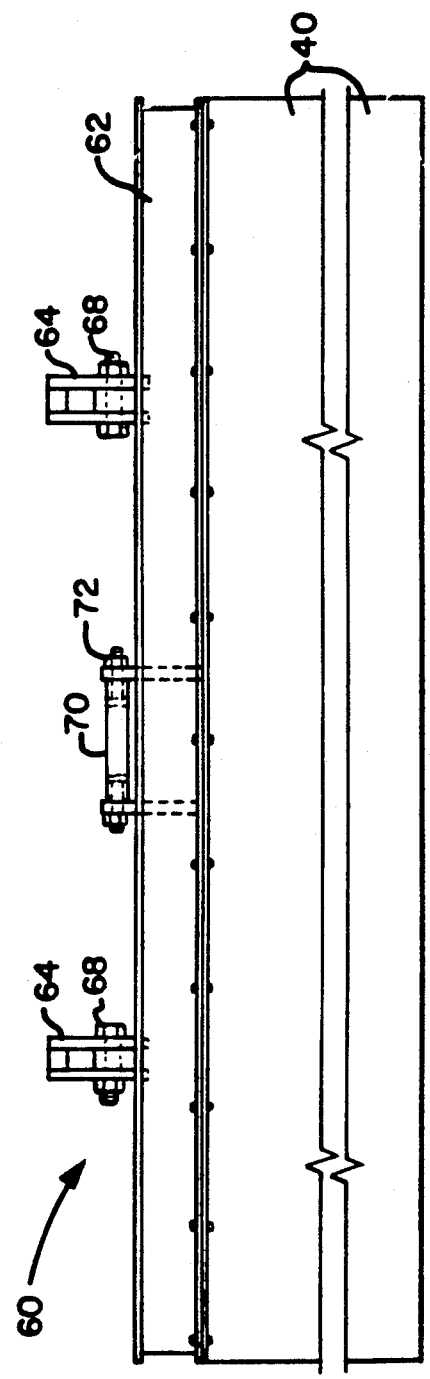

REACTOR HEAD SHIELDING APPARATUS

BACKGROUND OF THE INVENTION

1. Field of the Invention

This invention relates to the protection of workers on nuclear reactors and in particular, the protection of workers in the area of the nuclear reactor head.

Typically, nuclear reactors have a closure, called a head, covering the top end of the vessel which is bolted to the vessel by means of bolts passing through holes in a peripheral flange thereof. The head is usually spherically shaped above the peripheral flange with reactor control drive mechanisms mounted thereon within the top central area thereof. Reactor head lifting members in the form of stiff vertically extending rods, typically three equally spaced about the top, are located between the control drive mechanisms and the head securing bolts. The lifting members are secured to the head by integral bosses for lifting the head closure on or off the vessel when the head bolts are removed.

The top central area containing the reactor control drive mechanisms is significantly more radioactively dangerous to personnel in the area of the head bolts than the rest of the head area and the vessel because the control mechanisms are in communication with the reactor core. Often, a cylindrical shroud is provided between the lifting members and the control mechanisms of the top central area of the head, but these cannot provide protection of sufficient magnitude to the personnel working with the head bolts or in the vicinity thereof.

During refueling operations, the reactor vessel head must be removed to access the fuel. In order to do this, workers must remove the holddown bolts. Removal of these bolts requires appreciable time, thus causing the workers to expose themselves to radiation from the shroud area where the highly radioactive control rod drives are located. In addition, any work or maintenance that is performed around the head after it is stored on the operating deck will expose the workers to this radiation field. A system is needed that will provide and allow for the following:

1.) Shielding that can be attached and removed from the vessel head in a short time to minimize exposure;
2.) Shielding that will provide radiation protection without interfering with access to closure head holddown bolts; and,
3. Shielding that will allow additional thickness to be added to cover "hot spots".

DESCRIPTION OF THE RELATED ART

It has heretofore been known for workers in the area of the headbolts and peripheral flange of the head to construct a frame clamped to the lifting legs above the head. Men standing on the peripheral flange, or a platform adjacent thereto, lifted shielding lead wool blankets weighing approximately 100 pounds, over their shoulders and/or heads to hang them over the frame between the top central area of the head and the head bolts. This effort was exhausting and time consuming and exposed the workers to radiation from the reactor control drive mechanisms for significant periods of time.

SUMMARY OF THE INVENTION

The present invention is designed to minimize the time and amount of radiation exposure to personnel working with reactor head bolts or in the vicinity thereof. It involves erection of a nuclear reactor head shielding apparatus on a frame supported by the spaced reactor head lifting members radially inwardly of the head bolts without significant worker exposure.

The proposed solution of the invention utilizes an approach related to the one previously used for shielding in this area. It basically consists of a frame made up of segments which are attached to the lifting legs by special mounting means permitting vertical assembly motion. Lead wool blankets are hung from the frame segments. The segments are attached and removed from the lift legs by a pair of the same radial arm hoists mounted for peripheral travel which are used to remove the closure head bolts. An inwardly directed extension member permits the segments and lead blankets hanging therefrom to be lowered by the pair of hoists until downwardly projecting mounting means on the segments' ends telescope into complementary upwardly open recessed members secured to the head lifting legs by means of clamp type brackets installed on each of the three lifting rods. A spacer clamp is installed under this clamp to preclude slipping of the clamp in the event of bolt relaxation and to provide rapid placement of the clamp. The lead wool blankets hang from the support structure on upwardly open hooks to cover the areas of radiation concern yet allow for maintenance and unobstructed access to the holddown bolts. Additional lead wool blankets can be added to provide protection in the case of "hot spots".

The system is novel in the method of installing the shield because it provides rapid installation and removal. Moreover, no permanent head attachments are required. This eliminates the need for costly seismic analysis.

In another embodiment, the means for hanging include hooks open downwardly and pivotally fixed to a hanger with at least one other pivotally fixed hook. The hangers each correspond to a section of periphery. In this embodiment, the hangers' pivoted hooks have means biasing them radially inwardly and in the downwardly open position. The preferred means biasing them is a center of gravity lying radially inside the pivot axis of the hooks such that gravity supplies the biasing force. Stop means ensure that the hooks pivotally attached to the hanger extend substantially inwardly and horizontally so as to provide grappling means to attach the hanger to the frame. This is accomplished by supporting a lead blanket shielding on the hanger and lowering the hanger with the shielding until the hooks grapple, pivot and hang the shielding radially inwardly of the head bolts. The shielding is thus supported radially inside of where the hoist alone would place it since the hoist is aligned directly over the head bolts. The hoist hook is lowered until the grapple, radial inward movement and crane hook disengagement from the hanger occur, in that sequence.

The hoist hook engages the hanger by a bail means pivotally attached to the hanger. The center of gravity of the bail biases it downwardly against a stop and the bail extends radially outside of the hanger, substantially over the head bolts and in line with the hoist hook. The pivotal attachment of the bail is radially inside the center of gravity of the bail to accomplish the desired bias and accessibility of the bail to the hoist hook.

To remove the assembly, the hoist hook is pushed inward to engage the bail, then the hoist hook is continually raised. The load will be picked up by the hoist until the weight is on the hoist. At that time the hooks will be horizontal and disengage the pipe structure. The hoist can then be travelled outward to allow the lead blanket assembly to be lowered and stored.

BRIEF DESCRIPTION OF THE DRAWINGS

FIG. 8 is a schematic fragmentary front elevational view of the apparatus of the embodiment of the invention which includes a hanger;

FIG. 9 is a plan view of the apparatus of FIG. 8;

DETAILED DESCRIPTION OF THE PREFERRED EMBODIMENTS

Figure 2:
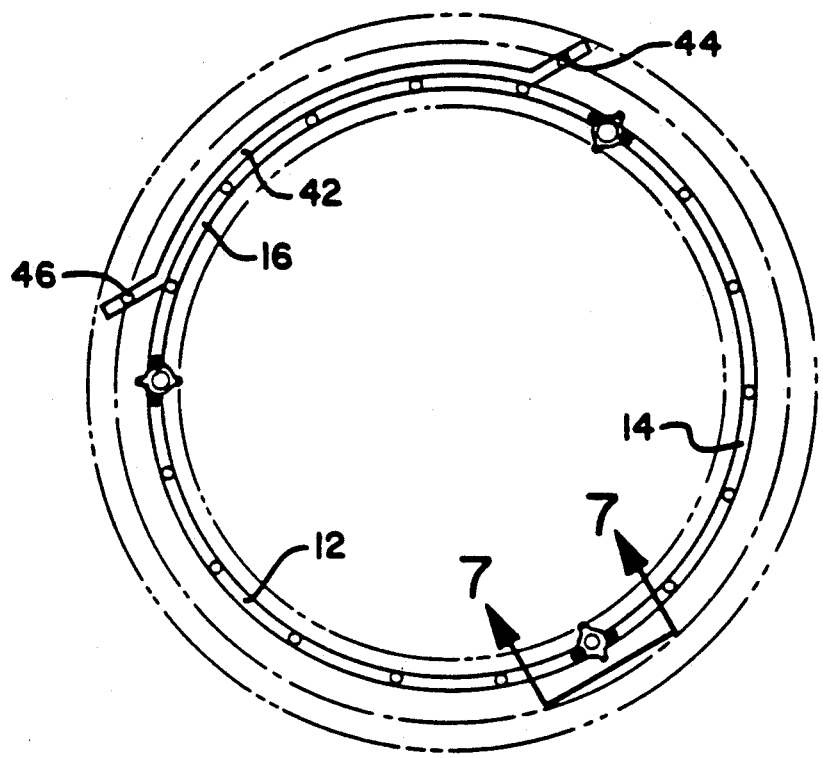
FIG. 2 is a schematic fragmentary plan view of the frame along line 2—2 of FIG. 1.

The numeral 10 generally designates a frame made up of sections 12, 14 and 16, each of which has hooks 18 and corresponds to one-third of the periphery of the head 20. Frame 10 lies between head bolt locations or holes 22 and the top central area 24 of the head. Typically, this area is surrounded by a shroud 26 shown in phantom in FIG. 1. Within the area 24 and shroud 26 are highly radioactive control mechanisms (not shown) in communication with the reactor core.

Apertured integral ears or bosses 28 provide a pivotal connection with head 20 for stiff vertical extending rods or head lifting members 30. The lifting members are used in connection with an overhead crane (not shown) and upper beam numbers 32 and 34. A hoist 36 and radially outwardly cantilevered beam 38 on which it can traverse from a position over bolt locations 22 radially outwardly is mounted for traverse in a peripheral path on beams 32 and 34 in a manner not shown but well known in the art. Typically, three hoists 36 would be utilized and controlled from the vicinity of bolt locations 22 for manipulation of the head bolts (not shown).

Figure 1:
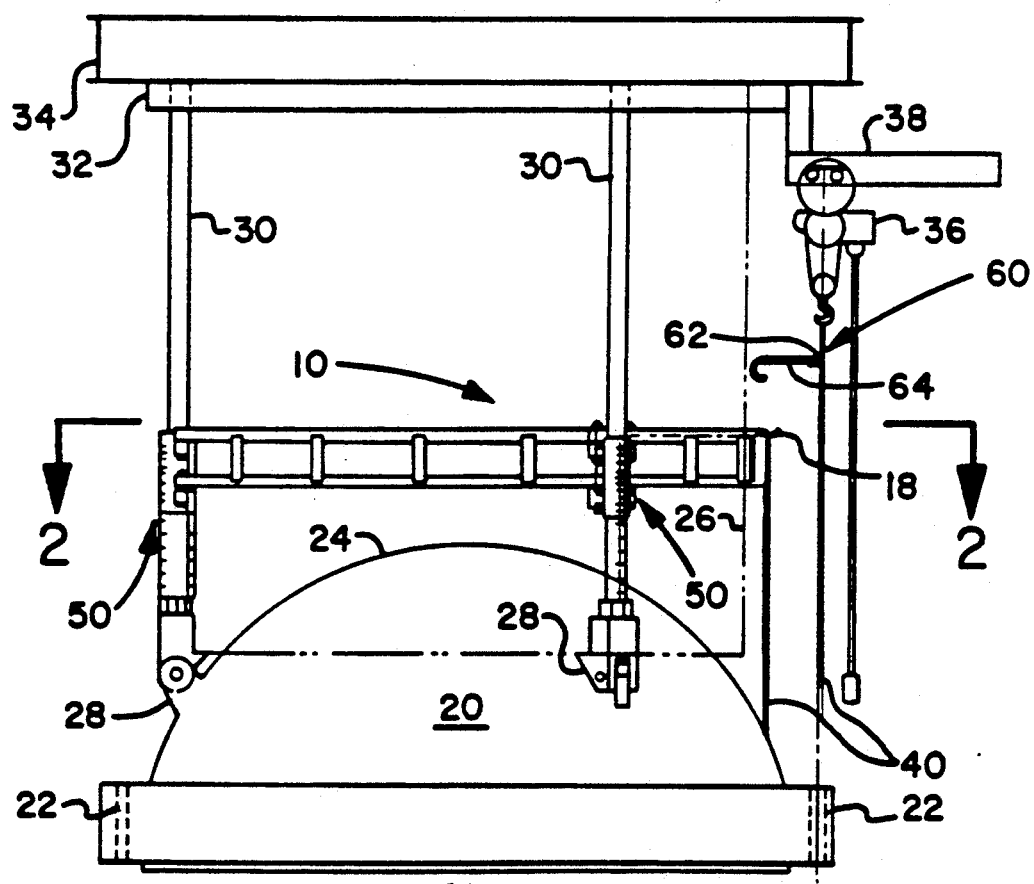
FIG. 1 is a schematic fragmentary front elevational view of nuclear reactor head shielding apparatus according to the principles of the invention showing the frame and two embodiments.
Figure 4:
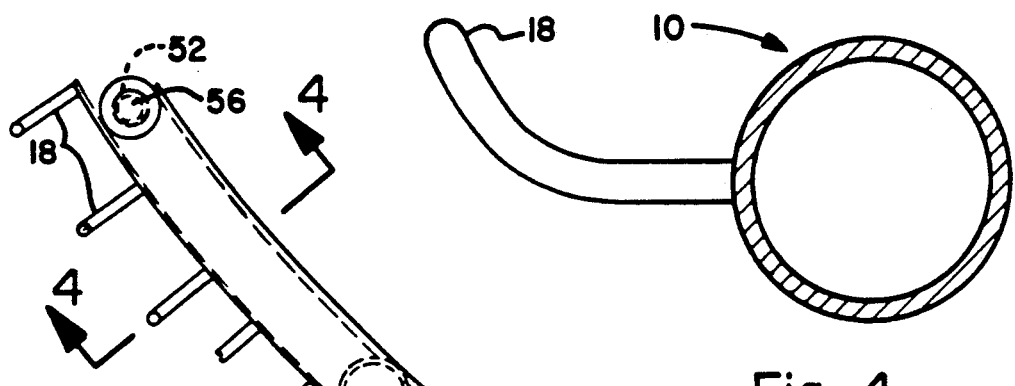
FIG. 4 is a cross-sectional view taken along the line 4—4 of FIG. 3.

As illustrated in FIG. 1, the hoist 36 can be seen to be limited in radial inward travel past the bolt locations 22. This fact is accommodated by the invention, as it affects the ease of hanging lead shielding in the form of lead blankets 40 between the top central high radiation area 24 and the bolt holes 22. In the prior art, a frame mounted on the head lifting members 30 required manual hanging of the blankets, which weigh approximately 100 pounds each, on a frame over the head 20 because the hoists could not travel radially inwardly of the bolt locations 22 where the blankets were to be hung. The lifting bracket 42, as shown in FIG. 2, has convenient hook means (not shown) such that it can detachably engage the upper rail of the segments 12, 14 and 16 of the frame 10 even though blankets 40 are hanging from hooks 18. A pair of hoists 36 (only one is shown in FIG. 1) each has its hook engaging end 44, 46 of the bracket 42 which extends along the center of gravity of the bracket 42 and segment 16 and over the bolt holes 22. In this way the segments are quickly raised and lowered with the heavy lead wool shielding blanket pre-hung on hooks 18. Accordingly, the shield blankets are installed away from the head 20. Heavy work is done therefore in a low radiation and contamination area where rad con clothing and fatigue is not a problem.

Figures 3, 5:
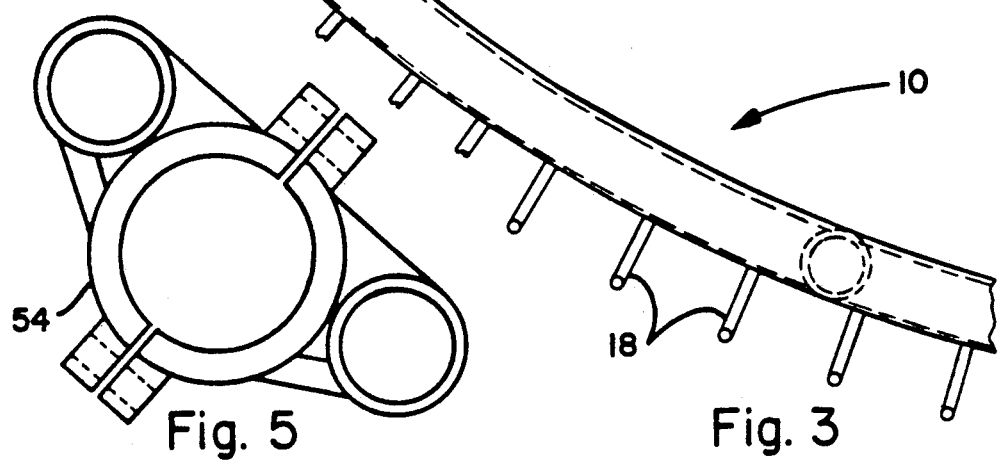
FIG. 3 is an enlarged schematic fragmentary plan view of a portion of the frame of FIGS. 1 and 2.
FIG. 5 is a plan view of a portion of the mounting means for the frame.
Figure 6:
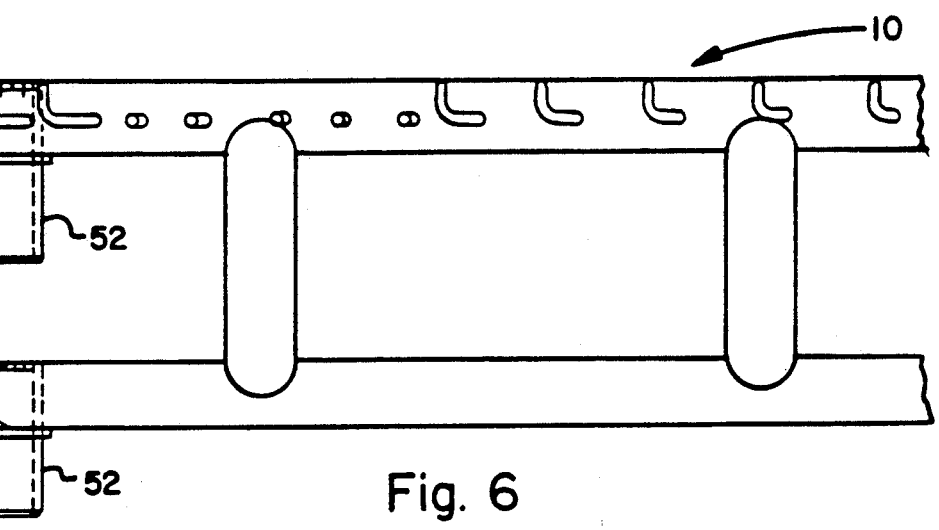
FIG. 6 is an enlarged schematic fragmentary front elevational view of the portion of the frame of FIG. 3.
Figure 7:
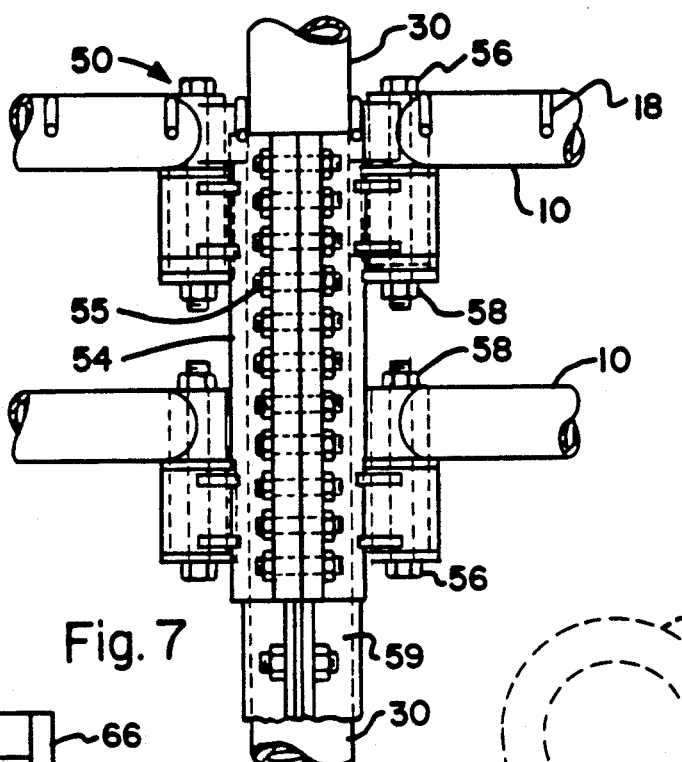
FIG. 7 is an enlarged fragmentary view taken along the line 7—7 of FIG. 2.
Figure 10:
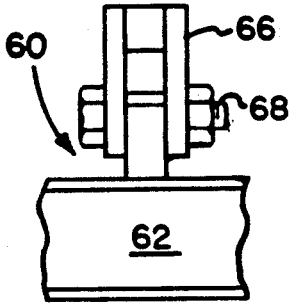
FIG. 10 is a view taken along the line 10—10 of FIG. 9.
Figure 11:
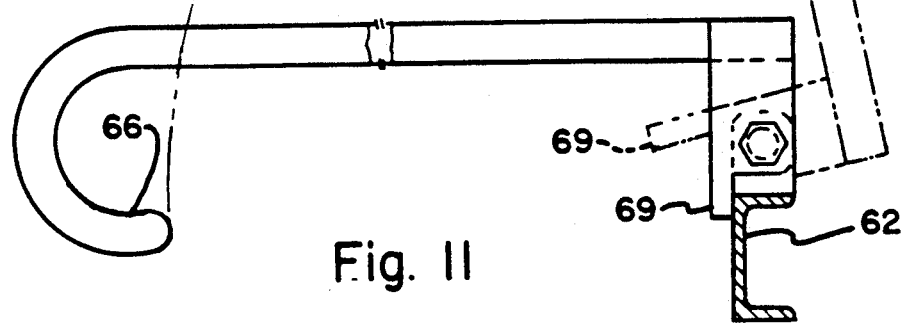
FIG. 11 is a view taken along the line 11—11 of FIG. 9.

FIG. 1 shows the location of the bolted clamp type of mounting means which is generally designated by the numeral 50. The mounting means 50 is shown assembled in FIG. 7. The downwardly projecting members 52 at either end of sections 12, 14 and 16 of frame 10 are received in the complementary upwardly open recessed members 54 held by bolts 55 to lifting members 30, and illustrated in FIGS. 5 and 7, upon their being lowered thereto on the hooks of hoist 36. Capture bolts 56 and nuts 58 secure the mounting means assembly. A locating clamp 59 can be pre-installed on lifting member 30 to facilitate the assembly operation.

As pointed out above, in a second embodiment, the lead shield blankets 40 are installed in groups on hangers generally designated by the numeral 60. In the use of hangers 60, the pipe structure or frame 20 may be installed on lifting rods 30, as above, that is, as a unit, but without the blankets 40 on them. In fact, in this second embodiment, frame 20 may be permanently installed.

The lead blankets 40, in the second embodiment, FIGS. 8–11, are attached to a shorter curved structural member, such as rolled channel beam 62, of the hanger 60. The beams 62 may be of such size that, for example, nine sections or hangers 60 completely surround the top central area 24 of the head or the shroud 26, if one is present.

Located on top of the curved channel 62, where the center of gravity is radially inside the channel, are two pivotally mounted hooks 64 having downwardly opening light portions 66, pivotal connections 68 and stop means 69. The hooks 64 of hangers 60 are hinged so that they are biased to remain horizontal and pointed to the center of the arc formed by hanger 60, when at rest. The length of hooks 64 is such that when they are horizontal, they extend over the pipe structure of frame 10. The hanger 60 is lowered by means of hoist 36 with lead wool shielding blankets 40 attached thereto by suitable fasteners in a manner analogous to a hanging shower curtain.

As the hanger 60 and blankets 40 are lowered, the hooks 64 act as grapples and engage the top of frame 10 and swing the blankets 40 inward against the frame and shroud 26 (if one is present), to a position between the top central area 24 of the head 20 and the bolt holes 22. The load, typically 1,000 pounds, is transferred from the hook of hoist 36 to the frame 10.

The hook of hoist 36 engages hanger 60 by means of a bail 70 mounted over its center of gravity. The bail 70 is pivotally attached to hanger 60 by pivot connection 72 lying inside of the curved channel 62 such that the radially outwardly extending bail 70 is biased downwardly against a stop substantially over the head bolt locations 22. This makes it accessible to the hook of hoist 36 and permits the hook to disengage from the bail 70 when the load is transferred to frame 10 with the blankets 40 hanging from hanger 60.

We claim:

1. A nuclear reactor head shielding apparatus for mounting on spaced reactor head lifting members radially inwardly of the head bolts comprising in combination:
   a frame of sections for mounting on said lifting members and extending around the top central area of said head,
   mounting means for so mounting said frame sections, including downwardly projecting members on said frame sections and complementary upwardly open recessed members for fastening to said lifting members for receiving said downwardly projecting members when said frame sections are lowered thereto with lead shielding supported thereby on means for hanging lead shielding on said frame to minimize radiation exposure of personnel working with said head bolts or in the vicinity thereof.

2. A nuclear reactor head shielding apparatus for mounting on spaced reactor head lifting members radially inwardly of the head bolts comprising in combination:
   a frame of sections for mounting on said lifting members and extending around the top central area of said head,
   mounting means for so mounting said frame sections, including downwardly projecting members on said frame sections and complementary upwardly open recessed members for fastening to said lifting members for receiving said downwardly projecting members when said frame sections are lowered thereto by lowering means for supporting lead shielding on means for hanging lead shielding on said frame to minimize radiation exposure of personnel working with said head bolts or in the vicinity thereof.

3. The apparatus of claim 2 in which said means for hanging include hooks.

4. The apparatus of claim 3 in which the hooks are open upwardly.

5. The apparatus of claim 3 in which said hooks are open downwardly and pivotally fixed to a hanger with at least one pivotally fixed hook.

6. The apparatus of claim 5 in which the hanger's pivoted hook has means biasing it radially inwardly and in a downwardly open position.

7. The apparatus of claim 6 in which the means biasing is a center of gravity lying radially inside the pivot axis of the hook such that gravity supplies the biasing force.

8. The apparatus of claim 6 in which stop means ensure the hook pivotally attached to the hanger extends substantially radially inwardly and horizontally so as to provide grappling means to attach said hanger to said frame for support thereby upon lowering the hanger with lead shielding hanging therefrom until the hook grapples, pivots and hangs the shielding radially inwardly of the head bolts' locations and the lowering means disengages from the hanger.

9. The hanger of claim 8 in which the lowering means engages the hanger by a bail means pivotally attached to said hanger.

10. The hanger of claim 9 in which the bail means center of gravity biases the bail downwardly against a stop and the bail extends radially outside of the hanger substantially over the head bolts.

11. The hanger of claim 10 in which the pivotal attachment of the bail is radially inside the center of gravity of the bail.

* * * * *